Jan. 29, 1935.  J. DILLMAN  1,989,405
INSECT EXTERMINATOR
Filed Sept. 11, 1933   3 Sheets-Sheet 2

Inventor
Joseph Dillman

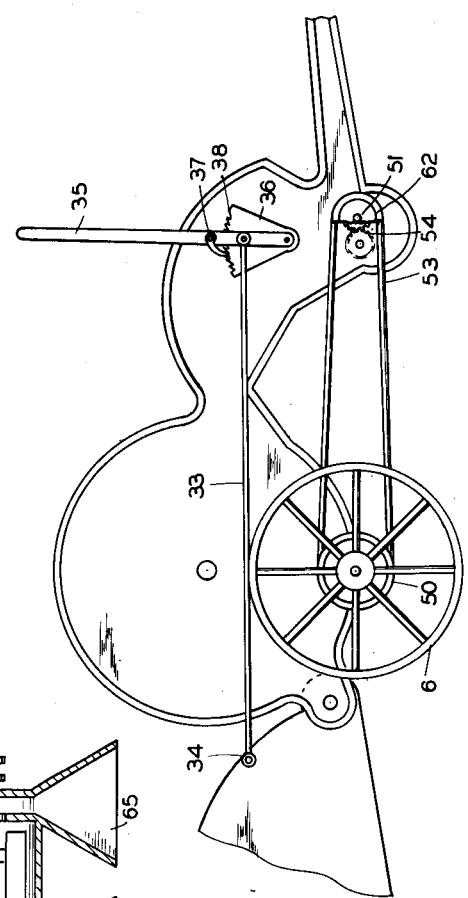
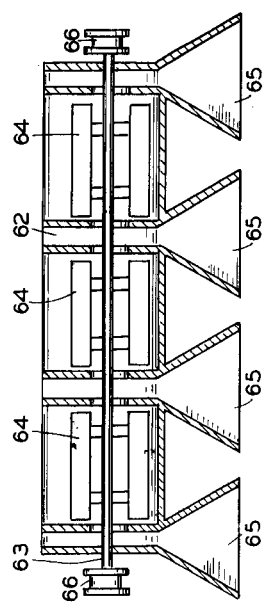
FIGURE 3.
FIGURE 4.
Inventor
Joseph Dillman

Patented Jan. 29, 1935

1,989,405

UNITED STATES PATENT OFFICE 1,989,405

INSECT EXTERMINATOR

Joseph Dillman, Strasburg, N. Dak.

Application September 11, 1933, Serial No. 689,031

1 Claim. (Cl. 43—140)

This present invention relates to an exterminator for insects, although it might have other similar purposes.

In certain climates crops are hurt to a vast extent by insects, noxious weeds, etc., but principally in certain parts by grasshoppers. It has been found that these insects lay their eggs in the fall and, in the spring, when the climate is warmer, the sun hatches them out. At that stage and for a while they cannot fly and remain on the ground, still destroying any vegetation which may be in their neighborhood. These grasshoppers are very abundant and, if allowed to develop, will fly away and destroy entire crops in the surroundings. I have, therefore, devised the present invention with a view of gathering at an early stage all these grasshoppers in a container so that they may be killed and used either as feed for fowl or else destroyed. Of course, this machine may be utilized, where the grasshoppers have been allowed to develop, in a form slightly different and which I have illustrated and described.

One of the objects of my invention is, therefore, to provide a unit of machinery which might be used on a farm to eliminate grasshoppers, which form a menace to the crops in some districts.

Another object of the invention is to provide such a machine as described which will not hinder the crops during its functioning and will eliminate at the same time any noxious weeds or seeds which might lie in its path.

A further object is to provide such a unit which may be easily attached to vehicles found on a farm and adapted for use on various kinds of grounds, whether rocky or smooth.

More particularly, my invention essentially comprises a suction device which may be mounted on wheels and guided in any suitable direction and thereby draw insects, such as grasshoppers, from the ground and the surrounding atmosphere, as well as weeds, or other foul seeds, etc.

Other attachments are provided and described later on in the specification.

Other objects and advantages will become apparent by perusual of the following description of the preferred embodiment of my invention supplemented by drawings in which, Figure 1 is a right-hand side elevation of the complete machine;

Figure 3 is a left-hand side elevation of the rear portion of the machine; and

Figure 4 is a sectional elevation of the insect vacuum attachment.

Similar characters of reference denote similar and/or corresponding parts througout the drawings.

Figure 2:
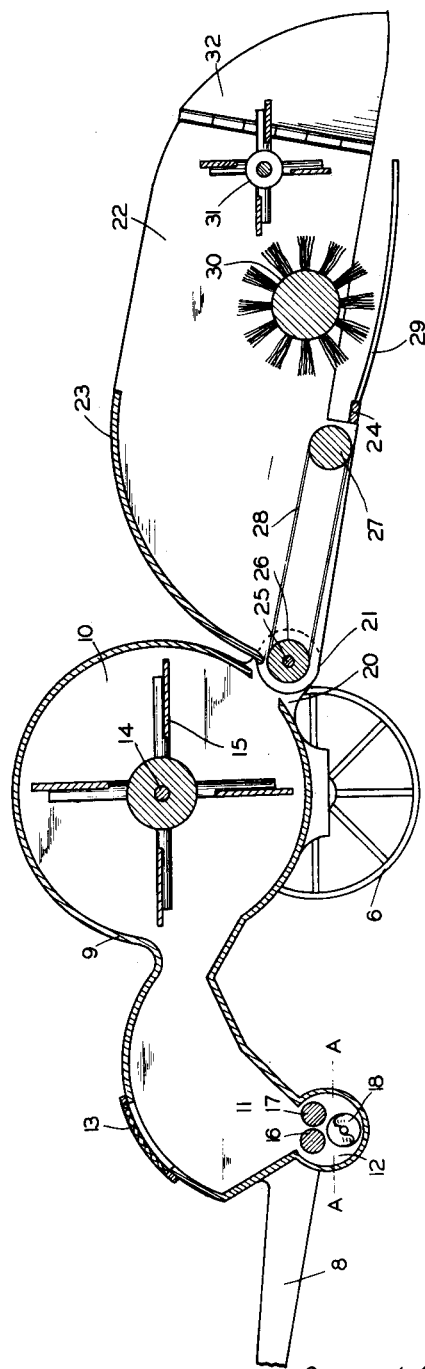
Figure 2 is a longitudinal sectional elevation thereof.

The machine consists, in the present illustration, of side castings 5—5 supported on wheels 6 mounted on trunnions 7. The side castings have extensions 8 ending in such form, not shown, for support on and draft, by either a power tractor, used as a pusher, or else a sulky for horse drawing. These two sides are joined by a metal shell 9 as shown in Fig. 2, forming a blower chamber 10, an insect receiving chamber 11 and a crushing and ejecting or crushing and conveying trough 12 as the case may be.

The insect receiving chamber 11 is provided with a screen opening 13 as an exhausting means for air blown from blower 10. In chamber 10 is mounted on a shaft 14, in suitable bearings in both sides of the casing, a fan 15 consisting in the present case of four blades as shown but not limited to that number or to that type.

Figure 1:
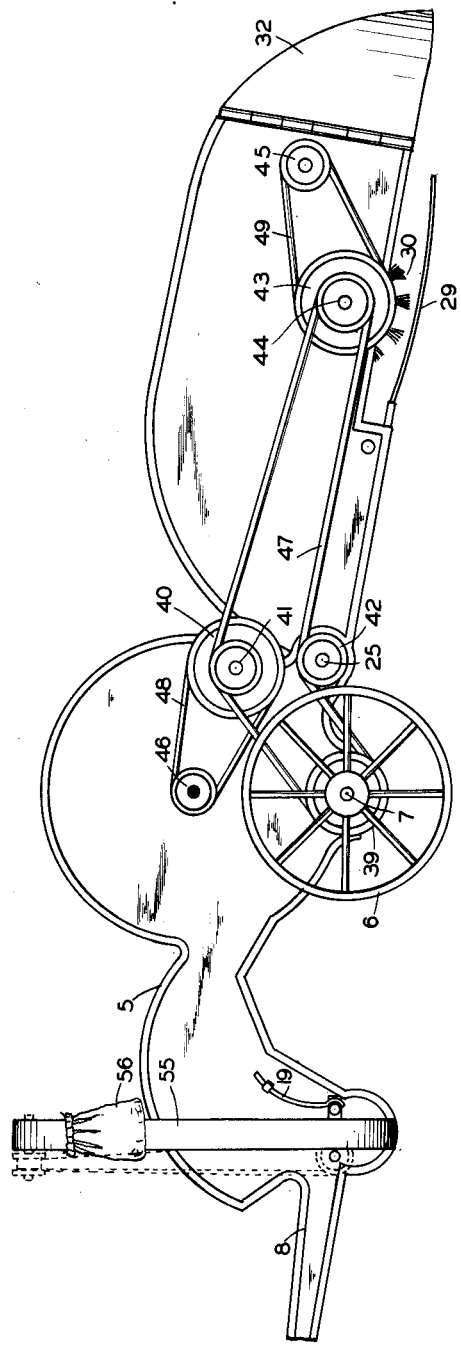

In trough 12 are mounted two crushing rollers 16 and 17 and worm screw 18 each having a suitable shaft or end shafts as the case may be resting in bearings, not shown, in both castings, bearings supporting roller 17 are of the sliding type so as to allow same to be pressed against roller 16 by means of springs mounted to both bearings, one being shown at 19, Fig. 1. One end of the springs rests on the bearing and the other is suitably fastened to the casting as shown.

Integral with each casting 5 is a lug 20 having a central bore adapted to register with a bore in similar lugs 21 forming an integral part of two second castings or sides 22 which, with partial shell 23 and cross bar 24, form the forward end of the machine. The two above-mentioned sections are held together by a shaft 25 passing through the said openings in lugs 20 and 21. This shaft is adapted to be rotated and supports a roller 26 which is paired by a similar roller 27 journalled at some distance therefrom as shown. Over these rollers is mounted a web 28.

From bar 24, and extending forwardly in a slight under curve, are wires or rods, one shown at 29, forming a rake. Over the rake is suitably journalled a rotary broom or brush 30 followed by a fan 31.

The forward end of the machine terminates in a pair of outwardly curved fins 32 to broaden the reach of the machine, one being hinged to each casting 22 as shown, so that they may be adjusted or folded when not in use.

It will be seen that owing to the means of mounting one section to the other, the forward end of the machine can be raised from or lowered to the ground as desired, and to this end, as shown in Fig. 3, a lifting rod 33 is pivoted to the forward section at 34 and connected at the other end to a lever 35 pivoted to a quadrant 36 as shown. The lever has a pawl 37 in engagement with ratchet teeth 38 and is disengaged in the conventional manner.

Rotation to the various elements described is in the following manner: On wheel 6, shown in Fig. 1, is a pulley 39, a combined small and large pulley 40 is mounted on a stud 41 fixed on casting 5, a pulley 42 is mounted on shaft 25 of roller 26, a combined small and large pulley 43 is mounted on shaft 44 of brush 30 and a pulley 45 is mounted on the shaft supporting fan 31. A pulley 46 is fixed to shaft 14 of main blower fan 15. A belt 47 passes around pulley 39 over pulley 42, around smaller part of pulley 43 and over smaller part of idler pulley 40. It will be seen, therefore, that when the machine travels on the ground, belt 47 will be caused to travel thereby imparting rotation to the web, to the brush and to idler pulley 40. A belt 48 is positioned around the larger part of pulley 40 and around pulley 46 to impart high speed to the main blower fan. Similarly, rotation is imparted to fan 31 by a belt 49 passing over larger part of pulley 43 and pulley 45.

On supporting wheel 6, shown in Fig. 3, is a driving pulley 50 and over shaft 51 of crushing roller 16 is a second pulley 52. A belt 53 passing over the said last-mentioned pulleys will evidently drive the crushing rolls which are inter-operated by two gears 54 as shown.

When the remains from the insects are left on the ground, the lower part of the trough from line A—A, as well as worm 18, are dispensed with, but when they are to be gathered, worm 18 is suitably geared to rollers 16 and 17 and a mechanically operated elevating chute 55 operated by ordinary means such as by pulleys and belt shown in dotted lines in Fig. 1, will lead the remains to a bag 56 or other container as the case may be.

In order to make sure that no insects will remain alive on the ground, poison spraying means may be installed on the machine. These may consist in a liquid poison containing tank or reservoir 58 mounted on the machine having a pipe 59 connected to a suitably supported spraying tube 60 across the underside of the machine. A valve 61 having suitable operating levers, not shown, accessible to the driver of the machine, will control the flow of the poison.

In Fig. 4, is shown another form of my invention consisting of a vacuum attachment to be positioned under the machine adaptable to certain grounds, whereby insects will be drawn into the machine. It may be positioned at a point under the main casing. It consists of a cylindrical casing 62 having a centrally disposed shaft 63 on which are mounted fans 64, and suction ducts 65 extending downwardly towards the ground. At each end of shaft 63 is a pulley 66 to be belted to the aforementioned pulleys on wheels 6. When the fans rotate air is blown in the machine creating a vacuum in the ducts, and drawing all insects in its path to the machine.

In operation, when the machine is set in motion and all rotating elements in action, insects on the ground will be raked and brushed onto the web, and those higher up blown in by fan 31 and drawn into the main blower chamber either by suction therefrom or by being carried on the web, from which they will be blown to chamber 11, whence they will fall between the rolls 16 and 17 and be exterminated. The air current will flow out through screened opening 13, and the insects after being crushed will either be left on the ground or carried by worm 18 and elevated to the bag or container 56.

While I have described my invention more or less strictly in accordance with the embodiment shown in the drawings, it must be understood that many changes may be made to suit the mode of manufacture of the machine or again to suit various requirements as will still be within the spirit of my invention as covered by the following claim:

I claim:

In a machine of the class described including separate wheels, a main casing, a section blower in said casing, an insect receiving chamber in said casing, crushing rolls in said receiving chamber, a second casing pivoted to the first casing, a travelling web in said second casing leading to the main casing, a rake mounted at the forward end of the second casing adjacent the ground, a brush over said rake, a fan at the forward end of said second casing, and means for actuating said blower, crushing rolls, web, brush and fan dependent on the rotation of said supporting wheels.

JOSEPH DILLMAN.